July 15, 1947.  F. Q. RAST  2,424,118
APPARATUS FOR CONTINUOUSLY RECORDING THE PATH OF FLIGHT OF AIRCRAFT
Filed April 29, 1943  4 Sheets-Sheet 2
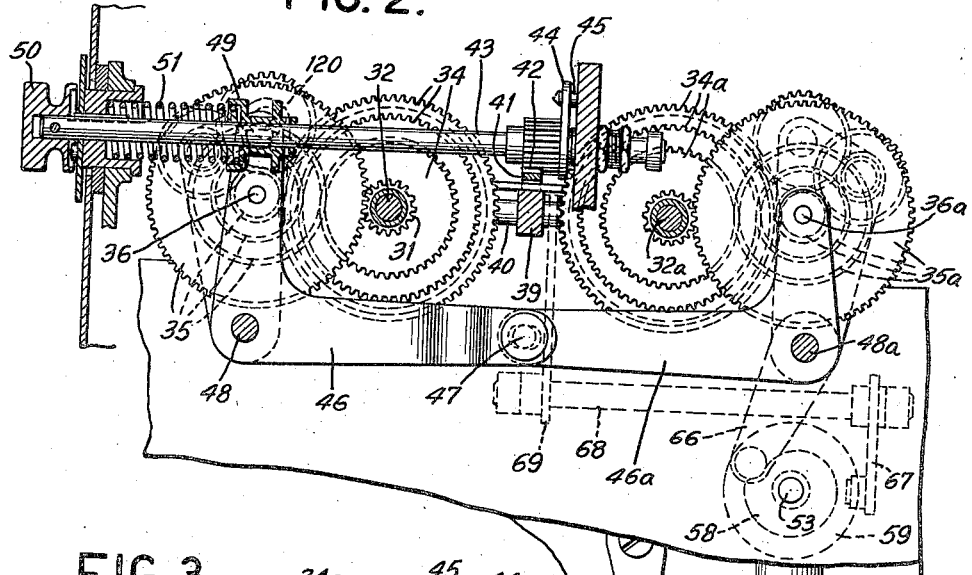
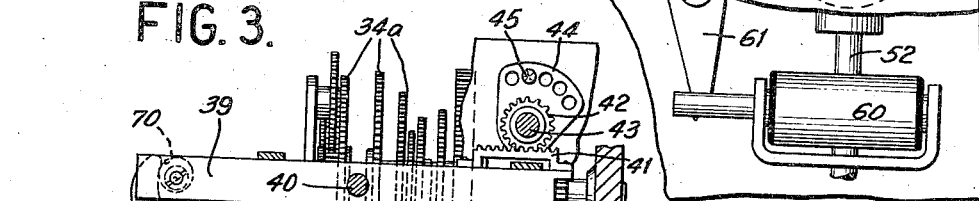
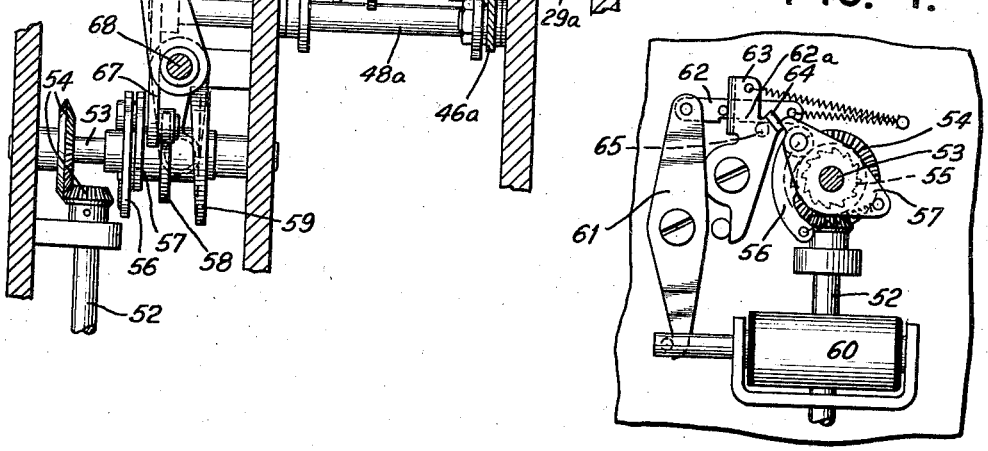
INVENTOR
Frederick Q. Rast
BY
W. Milton
ATTORNEY

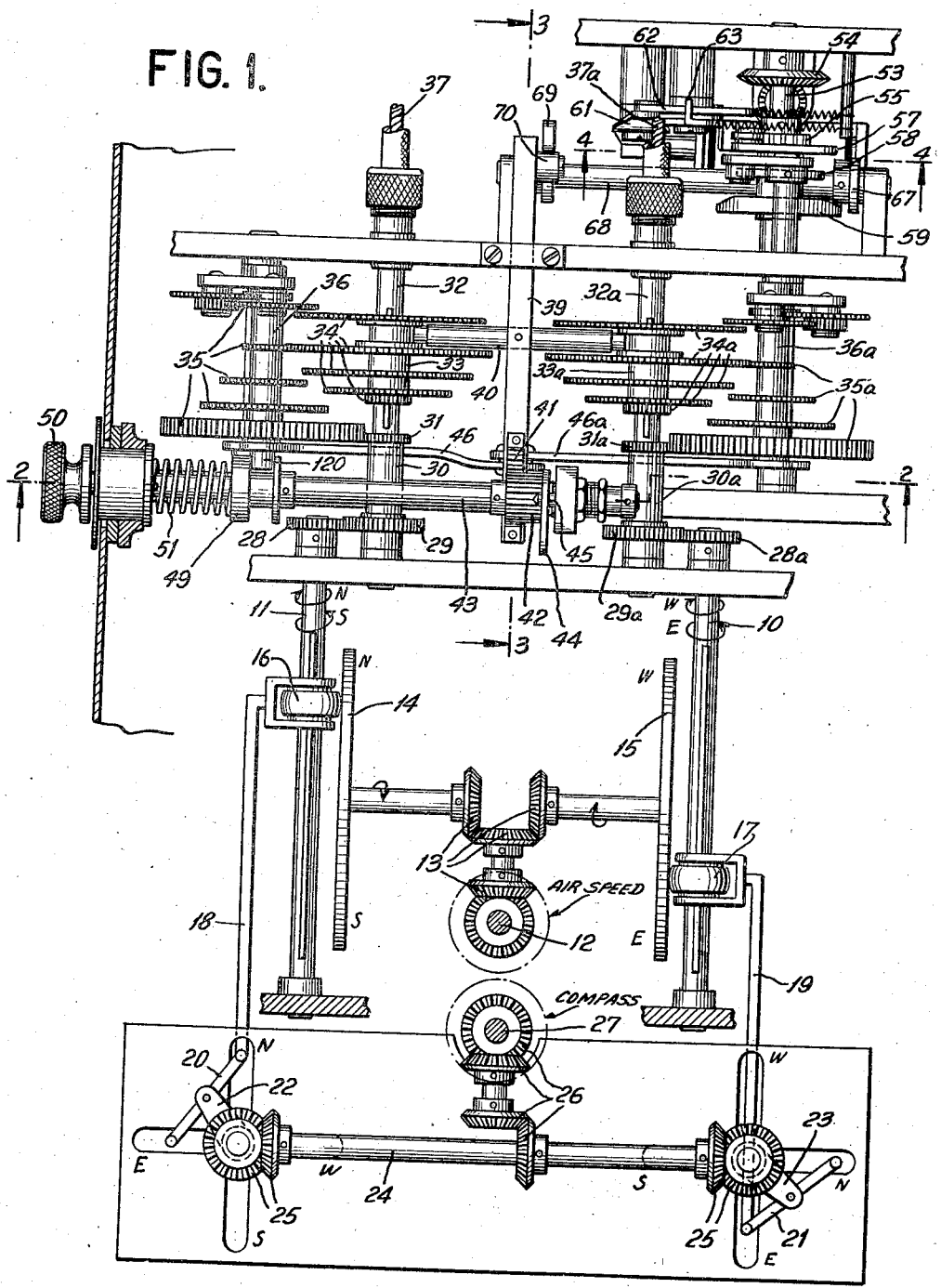

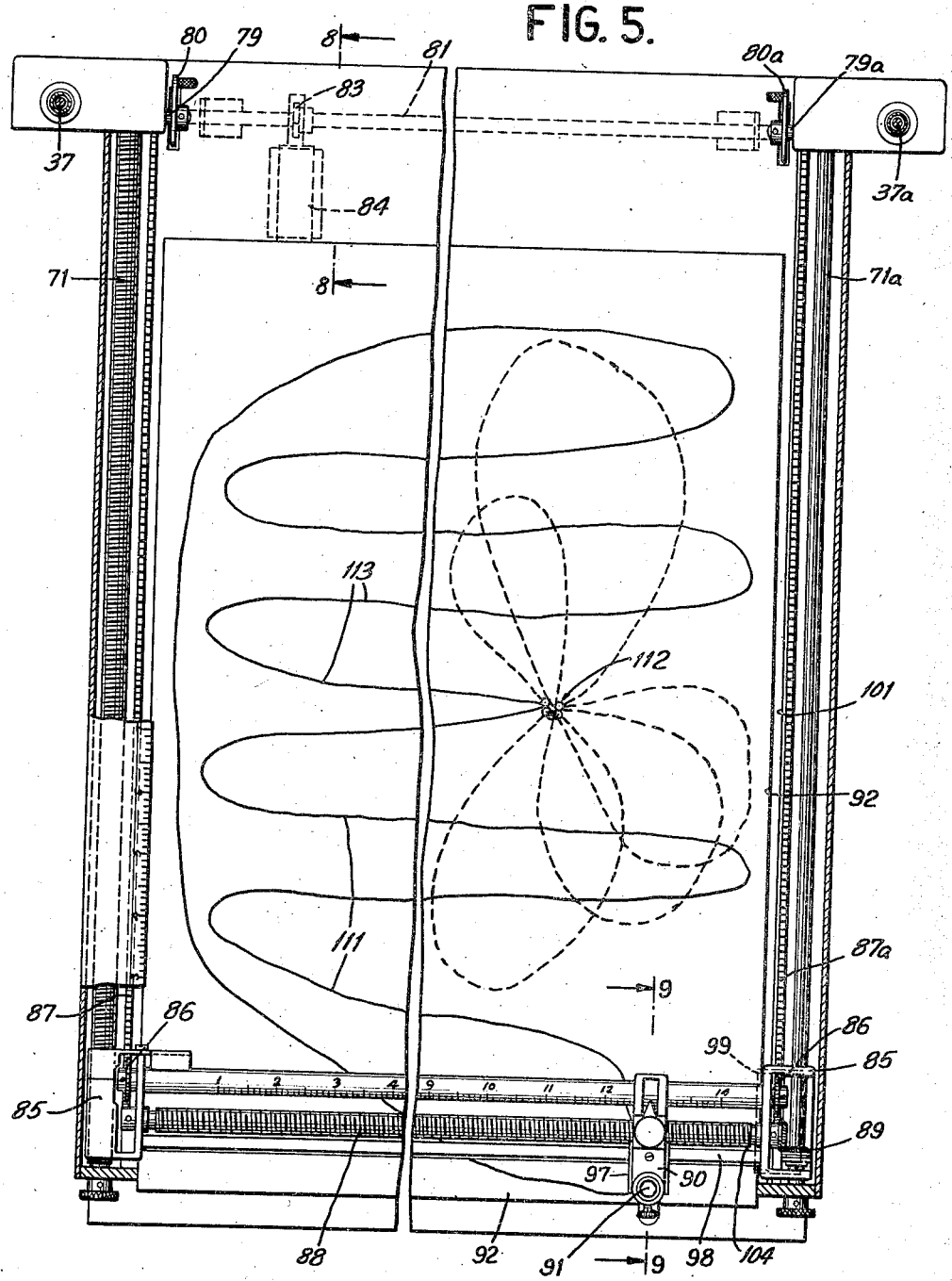

July 15, 1947.　　　　F. Q. RAST　　　　2,424,118
APPARATUS FOR CONTINUOUSLY RECORDING THE PATH OF FLIGHT OF AIRCRAFT
Filed April 29, 1943　　　　4 Sheets-Sheet 4

INVENTOR
Frederick Q. Rast
BY
W. M. Wilson
ATTORNEY

Patented July 15, 1947

2,424,118

UNITED STATES PATENT OFFICE 2,424,118

APPARATUS FOR CONTINUOUSLY RECORDING THE PATH OF FLIGHT OF AIRCRAFT

Frederick Q. Rast, Rochester, N. Y., assignor to International Business Machines Corporation, New York, N. Y., a corporation of New York Application April 29, 1943, Serial No. 485,023

6 Claims. (Cl. 234—26)

The present invention relates to a device for continuously and automatically recording the path of flight of an airplane and more particularly to a device of the type in which a graph is drawn to record the course of flight.

One of the objects of the invention resides in the provision of an auxiliary device cooperating with the recording mechanism to make an identifying mark on the graph as it is drawn, which device is responsive to a received signal and will accordingly indicate a point in the course of flight at which such signal is received.

A further object resides in the provision of the novel ratio mechanism for driving the recording mechanism, which is manually settable at a selected ratio to record the course of flight on a related scale. Mechanism is provided which is responsive to the reception of a signal for automatically shifting the ratio mechanism to a predetermined drive ratio concurrently with the operation of the auxiliary marking device.

In carrying out the objects of the invention, an integrating mechanism for continuously integrating the path of flight of an airplane in response to control by air speed, drift and direction indicators is employed to drive a stylus across the surface of a map through a change speed gear mechanism. This mechanism is provided with five different speed changes which are manually selected in accordance with the map scale employed.

An automatic shift is provided which, when operated, will automatically shift to the scale giving the greatest stylus movement for a given amount of travel. This is effected in response to a received signal so that the subsequent movement of the stylus will be in accordance with the new scale ratio. A device responsive to an electric impulse renders the automatic shifting devices effective and at the same time causes the auxiliary marking device to make a mark on the graph being drawn by the stylus at the point where the ratio is automatically shifted. Subsequent electric impulses will thereafter make additional marks, one for each impulse, at points on the enlarged scale graph which will correspond to the points at which impulses were received.

Provision is also made in the mechanism, whereby the recording stylus may be normally inactive in the course of a flight and be rendered active only in response to a signal in the form of an electric impulse. For this purpose coupling mechanism is provided for coupling the recording mechanism to the integrating device automatically, and for such use the gear shift mechanism will have been manually preset to the desired scale.

Specific features of the invention reside in the construction and arrangement of the gear shift mechanism and the marking device which identifies points on the path of flight.

Other objects of the invention will be pointed out in the folowing description and claims and illustrated in the accompanying drawings, which disclose, by way of example, the principle of the invention and the best mode, which has been contemplated, of applying that principle.

In the drawings:

Fig. 1 is a view showing a well known form of integrating mechanism or component solver and the manner in which it is arranged to drive the gear shift mechanism of the present invention.

Fig. 2 is a section taken substantially along lines 2—2 of Fig. 1.

Fig. 3 is a sectional view taken along lines 3—3 of Fig. 1.

Fig. 4 is a view taken along lines 4—4 of Fig. 1.

Fig. 5 is a view of the recording mechanism.

Figure 6:
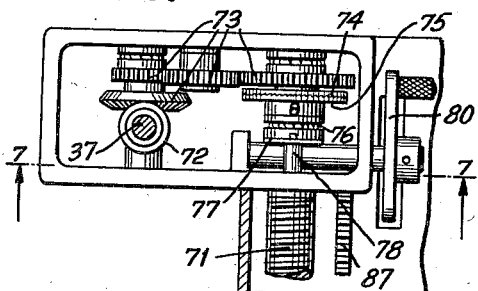
Fig. 6 is an enlarged detail of the upper left hand corner of Fig. 5 with the cover plate removed.

Referring to Fig. 1, there is shown in the lower half thereof a component solver of the type disclosed in patent to Reinhard Hugershoff, No. 1,873,126, dated August 23, 1932. This mechanism causes rotation of the shaft 11 proportional to the north or south movement of the vehicle, rotation being in one direction for north and the opposite direction for south. A similar shaft 10 is rotated proportional to the east-west movement of the vehicle with the direction of rotation being according to the east or west direction of movement. The manner in which these shafts are operated will be briefly described, and it is to be understood that other forms of component solving machanism may be employed in which the components of movement of the vehicle are resolved into rotation of shafts similar to 10 and 11.

A shaft 12 is driven from known devices in such manner that its speed of rotation is proportional to the air speed of the plane, and through bevel gear connections generally designated 13 a pair of friction disks 14 and 15 is caused to rotate. The disks 14 and 15 drive friction rollers 16 and 17 slidably keyed to the shafts 11 and 10, respectively, so that rotation of the disks is imparted to the shafts. The speed at which either shaft is driven depends upon the distance of the related friction roller from the center of rotation of the related disk or wheel.

The rollers 16 and 17 are positioned along their respective shafts by forked levers 18 and 19, and the displacement is effected in a known manner by means of cross slide controls 20 and 21, respectively, which cause displacement of the forked rods 18 and 19 amounts proportional to the sine and cosine respectively of the angle of rotation of driving cranks 22 and 23. These cranks are adjusted from a cross rod 24, through bevel gear connection 25, which shaft through bevel gear connection 26 is turned from a shaft 27, which in turn is positioned in accordance with the setting of a compass. The compass set shaft 27 takes into account the angle of drift in a manner explained in the patent referred to. Thus, briefly, the mechanism in the lower half of Fig. 1 constitutes a component solver which resolves speed and direction into north, south, east, and west components.

Shaft 11 has secured thereto a gear 28 and shaft 10 has a similar gear 28a which drive gears 29 and 29a, respectively. These gears are connected through sleeves 30 and 30a to pinions 31 and 31a, the gears and sleeves being freely rotatable on shafts 32 and 32a. Slidable on shafts 32 and 32a are sleeves 33 and 33a with which several gears generally designated 34 and 34a are integral and spaced for successive alignment with gears 35 and 35a on rods 36 and 36a. With the sleeves 33 and 33a in the position of Fig. 1, the largest gear 34, 34a is in driving engagement with the smallest gear 35, 35a. Thus, motion of shaft 11 is transmitted from gear 28 to gear 29, then from gear 31 to the largest gear 35, thence from the smallest gear 35 to the largest gear 34 to drive shaft 32 at a rate determined by the gear ratio of the chain of gears mentioned. This shaft 32 is connected by a flexible cable 37 to the recording mechanism, and a similar cable 37a driven from shaft 10 is also connected to the recording mechanism in a manner subsequently to be explained.

The manner in which sleeves 33 and 33a are positioned to effect different driving ratios is as follows: A slidable bar 39 carries a pin 40 extending into engagement with the two sleeves and is provided with rack teeth 41 meshing with a pinion 42 secured upon a rod 43. Adjacent to the pinion 42 is a locking plate 44 (see also Fig. 3) which has holes cooperating with a fixed pin 45. Movement of rod 43 toward the left as viewed in Fig. 1 will lift the plate 44 away from pin 45 and subsequent rocking of rod 43 will slide bar 39 and move the gears 34 and 34a into any of five different positions of alignment, in which the rod 43 is returned to locking engagement with pin 45.

Referring to Fig. 2, the rods 36 and 36a upon which gears 35 and 35a are mounted are supported in bell cranks 46 and 46a, respectively, the two bell cranks being joined through pin and slot connection 47 for concurrent rocking about their respective pivot rods 48, 48a in opposite directions. The bell crank 46 is provided with pin 120 (see Fig. 1) which engages in a grooved collar 49 secured to rod 43 so that, when the rod 43 is moved toward the left in Fig. 1, bell crank 46 will be rocked counterclockwise as viewed in Fig. 2, and the bell crank 46a will be rocked clockwise to disengage their respective gears 35 and 35a from the gears 34 and 34a, whereby the latter may be shifted into position, after which upon release of rod 43 the bell cranks will rock to reengage the gears.

The extremity of rod 43 is provided with a hand knob 50 by means of which it may be shifted axially, and spring 51 is provided for holding the rod toward the right as viewed in Figs. 1 and 2. When sleeves 33 and 33a are in their farthest downward position, as viewed in Fig. 1, the smallest gears 34, 34a are in engagement with the largest gears 35, 35a respectively, and in such position sleeves 30 and 30a and shafts 32 and 32a rotate in unison for a maximum scale recording.

A mechanism is provided for automatically shifting the gears 34 and 34a to the "highest scale" position. This mechanism is as follows: A shaft 52 (Fig. 3) constantly driven from a source not shown drives a cross shaft 53 through bevel gears 54. Secured to this shaft 53 is a ratchet 55 in the plane of which lies a spring pressed clutch dog 56 (see also Fig. 4) which is pivoted upon a plate 57 integral with a pair of cams 58 and 59 loose on the shaft 53. Energization of the clutch magnet 60 (Fig. 4) will rock a lever 61 to draw a spring pressed link 62 toward the left as viewed in Fig. 4. A shoulder 62a on the link will engage and rock a second lever 63 to withdraw a latching extension 64 from engagement with a toe of pawl 56, whereupon the latter will engage with the constantly rotating ratchet 55 and plate 57, together with cams 58 and 59 will rotate through a complete revolution. A pin 65 in lever 63 will lift link 62 upwardly to disengage it from the lever 63, whereby the lever 63 will rock back into latching position to engage and disconnect the pawl 56 after a revolution.

During this revolution cam 58 rocks a follower arm 66 secured to rod 48a (see Fig. 2) to cause rocking of bell cranks 46 and 46a and consequent disengagement of the gears. While the gears are so disengaged, the face cam 59 rocks a lever 67 secured to rod 68, to which rod there is also secured an arm 69 which engages a roller 70 in the slide 39 to move the slide toward the right as viewed in Fig. 3 or downward as viewed in Fig. 1 to shift the gears to their position of 1:1 driving ratio. The rocking of bell crank 46 has also through pin 120 (Fig. 1) drawn rod 43 to the left so that, at the time the gears are shifted, the plate 44 is out of engagement with the fixed pin 45 and will return to locking position after the shift has been effected.

Figure 7:
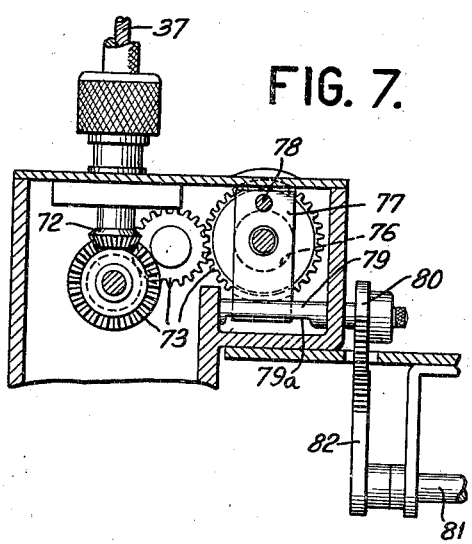
Fig. 7 is the detail taken on lines 7—7 of Fig. 6.

Referring now to Fig. 5, the flexible driving cables 37, 37a are shown in the upper part of the figure and the connections from cable 37 for driving the lead screw 71 will now be traced. Referring to Figs. 6 and 7, the flexible shaft 37 drives a bevel pinion 72 and through gearing generally designated 73 drives one side 74 of a toothed coupling. The other side 75 of the coupling is slidably pinned to the lead screw 71. Adjacent to the member 75 is a roller bearing 76 against which a leaf spring 77 (see Fig. 8) bears. This spring is anchored at its upper end at 78, and at its lower end it bears against the periphery of a rod 79 which has a flat 79a thereon. When spring 77 bears against flat 79a the parts 74, 75 are uncoupled. The outer end of the rod 79 has secured thereto an arm 80 which, when rocked to the position of Fig. 8, will cause the rod 79 to bear against spring 77 and hold the coupling 74, 75 together, so that shaft 76 may drive the lead screw 71.

Figure 8:
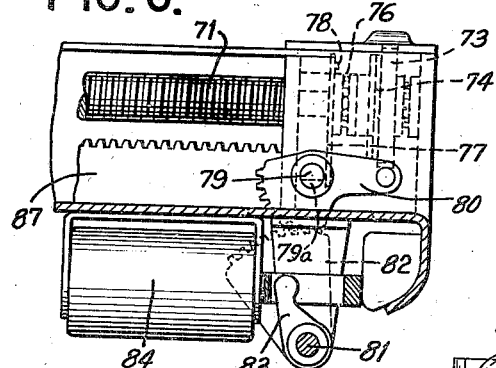
Fig. 8 is a detail taken on lines 8—8 of Fig. 5.

If arm 80 is manually rocked 90° counterclockwise from the position shown in Fig. 8, tension on spring 77 will be relieved with the result that the driving connection is broken. Referring to Fig. 5, the shaft 37a drives the splined shaft 71a in an exactly similar manner to that explained for the lead screw 71, and there is also provided an arm 80a for effecting coupling of the shafts 37a and 71a. The two arms 80 and 80a are interconnected through a rod 81 whose extremities carry gear sectors 82 which mesh with gear teeth on the arms, so that rocking of one arm is accompanied by like rocking of the other. In other words, both couplings are operated together. The shaft 81 has secured thereto an arm 83 in line with the plunger of a solenoid 84. If the arms 80 are in uncoupling position, energization of solenoid 84 will rock arm 83 counterclockwise as viewed in Fig. 8 to move both arms 80 and 80a to their coupling position. When it is desired to disconnect the stylus from its drive gearing, arms 80, 80a are manually rocked through 90° in a counter-clockwise direction (Fig. 8) to present the flat 79a to spring 77, so that 74, 75 are uncoupled. Either energization of solenoid 84 or manual rocking of arms 80, 80a will return the parts to coupled position.

Referring now to Fig. 5, 71 may be termed the north-south lead screw, and its rotation will be proportional to the north-south component of the movement of the vehicle. Threaded on this lead screw is a frame 85 which extends across the map table and also has connected pinions 86 which travel on stationary tracks 87. Moving with the frame 85 is the east-west lead screw 88 which is driven from bevel gear 89 which slides along the splined shaft 71a, from which it derives motion proportional to the east-west movement of the vehicle. Threaded on lead screw 88 is the pencil or stylus holder generally designated 90 in which a pencil 91 is held to trace the course of the vehicle on a map or other suitable surface designated 92.

Figure 9:
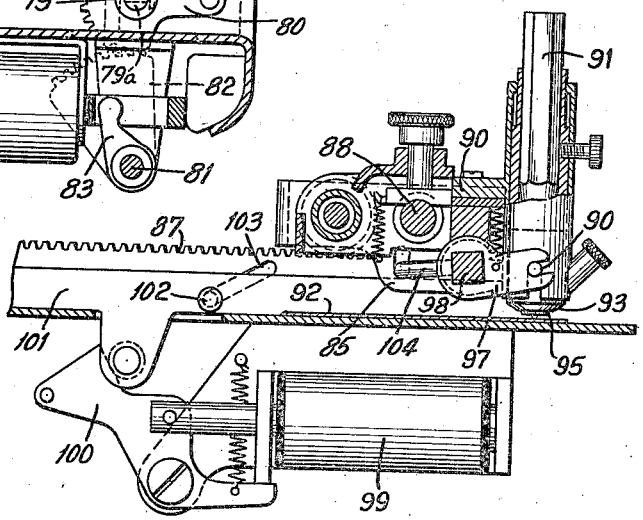
Fig. 9 is a detail taken along lines 9—9 of Fig. 5.
Figure 10:
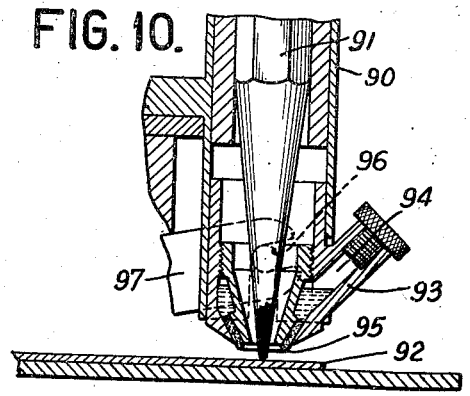
Fig. 10 is an enlarged detail of the stylus and marking device.

Referring to Figs. 9 and 10, the right hand extremity of the holder 90 forms a cylindrical sleeve within which there is slidably positioned a marking device generally designated 93, which comprises a fluid reservoir 94 and a marking wick 95 which surrounds the pencil 91. Downward movement of the marking device 93 will cause a circular ring to be made on the map 92. Pins 96 extend outwardly from the device 93, and these are engaged by arms 97 which are slidable along a square shaft 98 carried by the frames 85 and normally held in the position shown in Fig. 9 by a suitable spring. Located beneath the map table is a solenoid 99 which, when energized, will retract its plunger to rock a lever 100 clockwise and will move a bar 101 upwardly and toward the right as viewed in Fig. 9, this movement being effected through engagement of a pin 102 in the bar operating in an oblique slot 103 in the fixed rack 87. The square shaft 98 has near its extremity a finger 104 which extends over the upper edge of bar 101 so that, when the bar is elevated, shaft 98 will rock clockwise as viewed in Fig. 9 to operate the circular marking device. With this construction the marking device may be in any position on the map table and will be responsive to energization of magnet 99 in any position.

Figure 11:
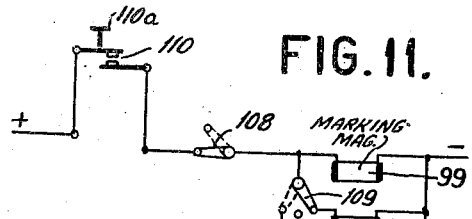
Fig. 11 is a diagram showing the manner in which the various clutch magnets are interconnected.

Referring to Fig. 11, 110 represents a switch or impulse sending device responsive to operation of a key 110a. If switch 108 is closed, the closure of contacts 110 will energize magnet 99 to operate the marking device and, if switch 109 is in the position shown, there will be a concurrent energization of clutch magnet 60 to change the driving ratio of the gear shift mechanism. It will be appreciated that, where there is repeated closure of contacts 110, the gear shifting mechanism will be effectively responsive to only the first impulse, since the gears will thereafter remain in shifted position until manually returned to some other position, whereas repeated energization of magnet 99 will effect repeated operation of the marking device.

With switch 109 in its alternate or dotted line position, clutch magnet 60 is disconnected and clutch magnet 84 will be rendered effective. Under such conditions, the recording device is not utilized for tracing the ship's course due to the initial manual declutching of the lead screw driving mechanism. Such driving will not be effected until an impulse is transmitted through the magnet 84. Again, the initial impulse will effect the clutching action and the clutch parts will remain in shifted position for driving the stylus, and subsequent impulses will effectively operate only the marking magnet 99 to mark selected points along the path traced by the stylus.

Referring to Fig. 5, a brief explanation will now be given to explain the manner in which the device operates. Assuming that the switches 108 and 109 are in the position shown in Fig. 11, that arms 80, 80a have been manually rocked to their coupling position of Fig. 8 and that the gear shift is adjusted to a scale other than its least reduction; and also assuming the device is installed in an airplane on patrol, the course may be traced by the stylus as indicated by line 111 on the surface of map 92. At the position indicated by 112, contacts 110 are momentarily closed, energizing magnets 99 and 60. This will cause the scale to be immediately increased and will cause the marking device to make a circle on the line. From this point the pilot may then direct the plane through the path shown in dotted lines, repeatedly intersecting the initial signal point. If contacts 110 are closed each time the point is crossed, a plurality of circles will be made forming a pattern. It will be remembered that the course is now traced at the largest possible scale, so that the pattern of circles will fairly define the point at which the signals or impulses are sent by contacts 110. In accordance with circumstances, the pilot may then take appropriate action and thereafter guide his plane back to the initial signal point, and resetting the gear shift to the initial scale and then resume his course along lines 113, ultimately returning to the starting position.

Where the entire course of the plane is not desired, the stylus may be initially set at a position near the center of the map arms 80, 80a set to uncoupling position and switch 109 thrown to its alternate position. Then when contacts 110 are first closed, a mark will be made at the point of setting of the stylus and movement thereof will commence with the first impulse of the magnets, so that the path of the plane from that point on will be traced. Commencement of the movement of the stylus is effected by energization of solenoid 84 which will rock arms 80, 80a and effect coupling as explained.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A course recorder of the class described, comprising a tracing surface, two rectangular coordinate axes related to said surface, a recorder movable parallel to each of said coordinate axes and in contact with said surface, a component solver operable to resolve a vehicle's movement along said rectangular coordinates normally effective, driving connections between said component solver and said recorder, selectively adjustable in accordance with any one of a plurality of driving ratios, an impulse sending device, and means controlled by said device for causing said driving connections to automatically effect a predetermined driving ratio between the component solver and the recorder.

2. A course tracer of the class described, comprising a tracing surface, two rectangular coordinate axes related to said surface, a recorder movable parallel to each of said coordinate axes and in contact with said surface, a component solver operable to resolve a ship's movement along said rectangular coordinate axes, driving connections between said component solver and said recorder, selectively adjustable in accordance with any one of a plurality of driving ratios for tracing a ship's course to a selected scale, a marking device movable with said recorder, operating means therefor, an impulse sending device, and means controlled by said impulse sending device for causing said driving connections to automatically effect a predetermined driving ratio and for concurrently therewith causing an operation of said marking device to indicate the point in the course at which the impulse is sent and the driving ratio shifted.

3. A course tracer of the class described, comprising a tracing surface, two rectangular coordinate axes related to said surface, a recorder movable parallel to each of said coordinate axes and in contact with said surface, a component solver operable to resolve a ship's movement along said rectangular coordinate axes, driving connections between said component solver and said recorder, comprising a gear shift mechanism manually shiftable to select any one of a plurality of driving ratios, power means for operating said gear shift mechanism to select a predetermined ratio, a marking device movable with said recorder, operating means therefor, an impulse sending device, and means controlled thereby for effecting a concurrent operation of said power means and the operating means of the marking device, whereby the driving ratio of the mechanism will be shifted and an indication made of the point in the course where the shift occurred.

4. A course tracer of the class described, comprising a tracing surface, two rectangular coordinate axes related to said surface, a recorder movable parallel to each of said coordinate axes and in contact with said surface, a component solver operable to resolve a ship's movement along said rectangular coordinate axes, driving connections between said component solver and said recorder, selectively adjustable in accordance with any one of a plurality of driving ratios for tracing a ship's course to a selected scale, locking means for the driving connections, power means for releasing said locking means, shifting said driving connections to record at a different scale and then rendering the locking means effective again during an operation of said power means, a marking device movable with said recorder, operating means therefor, an impulse sending device, and means controlled thereby for effecting a concurrent operation of said power means and the operating means of the marking device, whereby the driving ratio of the mechanism will be shifted and an indication made of the point in the course where the shift occurred.

5. A course tracer of the class described, comprising a tracing surface, two rectangular coordinate axes related to said surface, a recorder movable parallel to each of said coordinate axes and in contact with said surface, a component solver operable to resolve a ship's movement into rectangular coordinate axes, driving connections between said component solver and said recorder, selectively adjustable in accordance with any one of a plurality of driving ratios for tracing the ship's course to a selected scale, a marking device movable with said recorder, operating means therefor, a circuit closing device, operating means therefor, and means controlled by said circuit closing device for causing said driving connections to automatically effect a predetermined driving ratio and for concurrently therewith causing an operation of said marking device to indicate the point in the course at which the circuit closing device is operated.

6. The invention set forth in claim 2 in which settable control means is provided which when set in one position will render the ratio shifting and marking devices concurrently effective and when set in another position will render only the marking device effective.

FREDERICK Q. RAST.

REFERENCES CITED

The following references are of record in the file of this patent:

UNITED STATES PATENTS

| Number | Name | Date |
|---|---|---|
| 1,310,201 | Maxim | July 15, 1919 |
| 1,873,126 | Hugershoff | Aug. 23, 1932 |
| 518,534 | Olan | Apr. 17, 1894 |
| 1,433,985 | Cornelison | Oct. 31, 1922 |
| 1,732,718 | Gluer | Oct. 22, 1929 |
| 1,985,265 | Smith | Dec. 25, 1934 |